US008301571B2

(12) United States Patent
Lee et al.

(10) Patent No.: US 8,301,571 B2
(45) Date of Patent: Oct. 30, 2012

(54) METHOD OF PACKAGING BROADCAST CONTENTS

(75) Inventors: Sun-nam Lee, Suwon-si (KR); Myung-sun Kim, Ulwang-si (KR); Sung-hyu Han, Seoul (KR); Young-sun Yoon, Suwon-si (KR); Jae-heung Lee, Suwon-si (KR); Bong-seon Kim, Seongnam-si (KR); Moon-young Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1527 days.

(21) Appl. No.: 11/402,981

(22) Filed: Apr. 13, 2006

(65) Prior Publication Data

US 2006/0235797 A1 Oct. 19, 2006

Related U.S. Application Data

(60) Provisional application No. 60/670,699, filed on Apr. 13, 2005.

(30) Foreign Application Priority Data

Jul. 11, 2005 (KR) ........................ 10-2005-0062124

(51) Int. Cl.
*G06F 21/00* (2006.01)

(52) U.S. Cl. ................ 705/57; 705/51; 726/26; 726/30; 380/201; 380/203

(58) Field of Classification Search ........................ None
See application file for complete search history.

(56) References Cited

U.S. PATENT DOCUMENTS

| 5,987,126 | A  | * | 11/1999 | Okuyama et al. | ............. 380/203 |
| 6,118,871 | A  | * | 9/2000  | Okuyama et al. | ............. 380/201 |
| 6,223,285 | B1 | * | 4/2001  | Komuro et al.  | ............. 713/160 |
| 6,320,829 | B1 | * | 11/2001 | Matsumoto et al. | ....... 369/47.12 |
| 6,965,975 | B2 | * | 11/2005 | Jeong          | ............. 711/161 |

(Continued)

FOREIGN PATENT DOCUMENTS

EP 0924930 A2 6/1999

(Continued)

OTHER PUBLICATIONS

"Digital Transmission Content Protection Specification vol. 1 (Informational Version)", Jan. 7, 2004.*

(Continued)

*Primary Examiner* — Jamie Kucab
(74) *Attorney, Agent, or Firm* — Sughrue Mion, PLLC (57) ABSTRACT

A method of packaging broadcast contents are provided. The method includes: extracting a copy control bit from input broadcast contents and determining whether the broadcast contents will be stored after being encrypted based on the extracted copy control bit; creating usage rule information which includes an encryption method of the broadcast contents if it is determined that the broadcast contents will be stored after being encrypted; extracting the copy control bit from each new broadcast content sequentially input and detecting broadcast contents which include copy control bits indicating that the broadcast contents will be stored without being encrypted; and encrypting the input broadcast contents through the broadcast contents before the detected broadcast contents using the encryption method and packaging and storing the encrypted broadcast contents and the usage rule information. Therefore, the unauthorized copying of broadcast contents transmitted through a digital broadcast receiver can be prevented.

18 Claims, 8 Drawing Sheets

U.S. PATENT DOCUMENTS

| | | | |
|---|---|---|---|
| 7,155,108 B2 * | 12/2006 | Yokota et al. | 386/52 |
| 2001/0017828 A1 * | 8/2001 | Yamada | 369/47.12 |
| 2001/0053979 A1 * | 12/2001 | Kori | 705/1 |
| 2002/0044657 A1 * | 4/2002 | Asano et al. | 380/201 |
| 2002/0046178 A1 * | 4/2002 | Morito et al. | 705/51 |
| 2002/0144067 A1 * | 10/2002 | Jeong | 711/161 |
| 2003/0056105 A1 * | 3/2003 | Maes et al. | 713/176 |
| 2003/0061477 A1 * | 3/2003 | Kahn et al. | 713/150 |
| 2003/0077074 A1 | 4/2003 | Okamoto et al. | |
| 2003/0081778 A1 * | 5/2003 | Tsumagari et al. | 380/201 |
| 2003/0086568 A1 * | 5/2003 | Kato et al. | 380/201 |
| 2003/0175013 A1 * | 9/2003 | Kato et al. | 386/94 |
| 2003/0219230 A1 * | 11/2003 | Kato | 386/94 |
| 2004/0027393 A1 * | 2/2004 | Kato et al. | 345/838 |
| 2005/0100315 A1 * | 5/2005 | Han et al. | 386/52 |
| 2006/0140585 A1 * | 6/2006 | Strasser | 386/94 |
| 2007/0217762 A1 * | 9/2007 | Yahata | 386/94 |
| 2007/0239948 A1 * | 10/2007 | Muraki et al. | 711/162 |
| 2007/0258587 A1 * | 11/2007 | Harada et al. | 380/201 |
| 2008/0037948 A1 * | 2/2008 | Yahata | 386/46 |
| 2008/0052536 A1 * | 2/2008 | Shimizu et al. | 713/193 |
| 2008/0289048 A1 * | 11/2008 | Jeong | 726/27 |
| 2008/0317436 A1 * | 12/2008 | Sasamoto et al. | 386/95 |

FOREIGN PATENT DOCUMENTS

| | | |
|---|---|---|
| EP | 0959467 A2 | 11/1999 |
| EP | 1471521 A1 | 10/2004 |
| JP | 2000-287192 A | 10/2000 |
| JP | 2002-034018 A | 1/2002 |
| KR | 10-2004-0081147 A | 9/2004 |

OTHER PUBLICATIONS

"DTCP vol. 1 Supplement E Mapping DTCP to IP (Informational Version)", Nov. 24, 2003.*

"DTCP vol. 1 Supplement a Mapping DTCP to USB (Informational Version)", Feb. 25, 2002.*

"DTCP vol. 1 Supplement B Mapping DTCP to MOST (Informational Version)", Feb. 25, 2002.*

"DTCP/IP", available from <http://www.hexus.net/content/item.php?item=856&redirect=yes>. Posted Sep. 7, 2004.*

How Computers Work, Millennium Edition. White, Ron. Que Publishing, Indianapolis, 1999. ISBN 0-7897-2112-0. Chapters 1-9, 14-31 included.*

Extended European search report dated Nov. 8, 2010, issued in corresponding European application No. 06747357.9.

* cited by examiner

FIG. 1 (PRIOR ART)

| COPY CONTROL BIT | | OPERATION | |
|---|---|---|---|
| | | STORE | COPY |
| BF | OFF | O | O |
| | ON | O | O/X |

FIG. 2 (PRIOR ART)

| COPY CONTROL BIT | | OPERATION | |
|---|---|---|---|
| | | STORE | COPY |
| CCI | COPY FREE | O | O |
| | COPY ONCE | O | N/A |
| | COPY NO MORE | N/A | X |
| | COPY NEVER | X | N/A |

```
Packet () {
   bit(4 bytes)   ArrivalTimeStamp;
   TSPacket(188 bytes);
} class UsageRuleInformation() {
      unsigned int(32) magic_number;
      unsigned int(32) size_of_UsageRuleInformation;
      unsigned int(32) num_of_sequences;
      for (I = 0; I < num_of_sequences; i++) {
          unsigned int(32) sequence_start_packet_number;
          SequenceUsageRuleInformation usagerule_info;
   }
} class SequenceUsageRuleInformation() {
      unsigned int(1) is_encrypted;
      unsigned int(3) EachStatus_BfCci;
      unsigned int(4) encryption_scheme;
      unsigned int(8) encryption_parameters[];
      string content_id;
      DetailInformation detail_info;
} class DetailInformation() {
      String title;
      unsigned int(8) duration;
}
```

METHOD OF PACKAGING BROADCAST CONTENTS

This application claims priority from Korean Patent Application No. 10-2005-0062124, filed on Jul. 11, 2005 in the Korean Intellectual Property Office, and U.S. Provisional Application No. 60/670,699, filed on Apr. 13, 2005 in the U.S. Patent and Trademark Office, the disclosures of which are incorporated herein in their entirety by reference.

BACKGROUND OF THE INVENTION

1. Field of the Invention

Methods consistent with the present invention relate to packaging broadcast contents which prevents unauthorized copying of broadcast contents transmitted through a digital broadcast receiver and allows only a device having a corresponding content identification to play back the broadcast contents, thereby protecting the broadcast contents.

2. Description of the Related Art

Recently, there has been a surge in the transmission of digital contents using various communications media, such as the Internet, terrestrial networks, cable networks and satellites, and in the sale and rental of digital contents using large-capacity recording media such as compact disks (CDs) and digital versatile discs (DVDs). Accordingly, digital rights management (DRM), which is a solution to protect copyrights of digital contents, is emerging as an important issue. Thus, DRM methods of providing authorized users of a domain with various contents using devices included in the domain are actively being investigated.

Digital broadcast contents are transmitted from contents providers to users. Users are authorized to use digital broadcast contents only after they obtain the rights to use the digital broadcast contents. Thus, digital broadcast contents must be protected from unauthorized users.

The U.S. Federal Communications Commission (FCC) is considering a requirement to add a one-bit broadcast flag (BF) to high definition (HD)-grade contents digitally broadcast within the U.S. to prohibit the indiscriminate redistribution of digital terrestrial broadcast programs. In other words, the FCC intends to promote the safe use of digital broadcast contents using a technology that prevents unauthorized users from using digital broadcast contents when a BF included in the digital broadcast contents is on.

Figure 1:
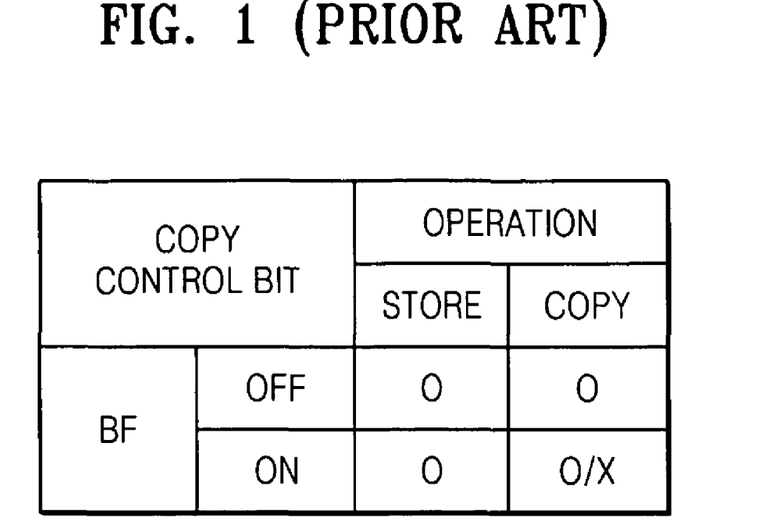
FIG. 1 is a conventional table showing operations which are allowed or not allowed according to a BF.

FIG. 1 is a conventional table showing operations which are allowed or not allowed according to a BF. Referring to FIG. 1, if a copy control bit included in broadcast contents is a BF, permission to store or copy the broadcast contents is given according to the type of the BF.

More specifically, when the BF is off, storing and copying of the digital broadcast contents are permitted. When the BF is on, the broadcast contents can be stored only after being encrypted, and can or cannot be copied. In FIG. 1, "O" indicates operations allowed and "X" indicates operations not allowed.

In 2005, the Open Cable standard is set to become the next-generation cable broadcast standard of the U.S. The Open Cable standard makes it compulsory to use copy control information (CCI) to control or restrict the storing or copying of contents received. CCI is two-bit control information which controls the copying of cable broadcast contents by indicating "copy free" (00), "copy once" (01), "copy no more" (10), and "copy never" (11).

Figure 2:
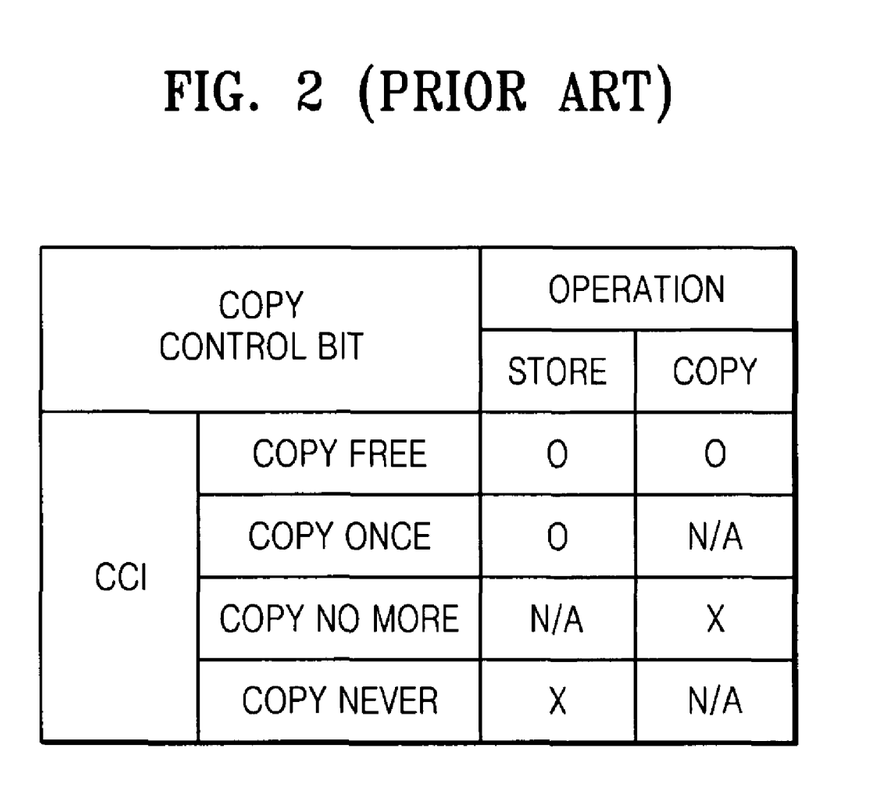
FIG. 2 is another conventional table showing operations which are allowed or not allowed according to CCI.

FIG. 2 is another conventional table showing operations which are allowed or not allowed according to CCI. Referring to FIG. 2, if a copy control bit included in broadcast contents is CCI, permission to store and/or copy the broadcast contents is given according to the type of the CCI.

More specifically, when the CCI is "copy free," broadcast contents can be stored and copied. When the CCI is "copy once," the broadcast contents can only be stored. When the CCI is "copy never," it is not allowed to store the broadcast contents, and when the CCI is "copy no more," it is not allowed to copy the broadcast contents. When the CCI is "copy free," the broadcast contents can be stored without being encrypted, and when the CCI is "copy once," the broadcast contents can be stored after being encrypted. In FIG. 2, "O" indicates operations which are allowed and "X" indicates operations which are not allowed.

As described above, there is a growing need for restricting the unlimited storing and copying of digital broadcast contents. However, a mechanism for packaging and storing digital broadcast contents and information regarding rules for using digital broadcast contents has not been suggested.

SUMMARY OF THE INVENTION

The present invention provides a method of packaging broadcast contents which prevents unauthorized copying of broadcast contents transmitted through a digital broadcast receiver and allows only a device having a corresponding content identification to play back the broadcast contents, thereby protecting the broadcast contents.

According to an aspect of the present invention, there is provided a method of packaging broadcast contents, the method including: (a) extracting a copy control bit from input broadcast contents and determining whether the broadcast contents will be stored after being encrypted based on the extracted copy control bit; (b) creating usage rule information which includes an encryption method of the broadcast contents if it is determined that the broadcast contents will be stored after being encrypted; (c) extracting the copy control bit from each new broadcast content sequentially input after operation (a) and detecting broadcast contents which comprise copy control bits indicating that the broadcast contents will be stored without being encrypted; and (d) encrypting the broadcast contents input in operation (a) through the broadcast contents before the broadcast contents detected in operation (c) using the encryption method and packaging and storing the encrypted broadcast contents and the usage rule information.

According to another aspect of the present invention, there is provided a method of packaging broadcast contents, the method including: (a) extracting a copy control bit from input broadcast contents and determining whether the broadcast contents will be stored, and if stored, whether the broadcast contents will be stored after being encrypted based on the extracted copy control bit; (b) creating usage rule information which includes an encryption method of the broadcast contents if it is determined that the broadcast contents will be stored after being encrypted; (c) extracting the copy control bit from each new broadcast content sequentially input after operation (a) and detecting broadcast contents which comprise copy control bits indicating other than characteristics that the broadcast contents will be stored after being encrypted; and (d) encrypting the broadcast contents input in operation (a) through the broadcast contents detected in operation (c) using the encryption method and packaging and storing the encrypted broadcast contents and the usage rule information.

According to another aspect of the present invention, there is provided a method of packaging broadcast contents, the method including: (a) extracting a copy control bit which indicates whether broadcast contents will be stored after being encrypted from each broadcast content sequentially input; (b) detecting whether characteristics of the extracted copy control bit are changed; (c) creating first usage rule information which comprises an encryption method of corresponding broadcast contents if the copy control bit indicates that the broadcast contents will be stored after being encrypted and creating second usage rule information indicating the absence of the encryption method if the copy control bit indicates that the broadcast contents will be stored without being encrypted; and (d) performing operations (a) through (c) on a predetermined number of broadcast contents, and packaging and storing first and second usage rule information created as a result of performing operations (a) through (c), broadcast contents encrypted using the encryption method included in the first usage rule information generated by the broadcast contents, and broadcast contents that generate the second usage rule information.

According to another aspect of the present invention, there is provided a method of packaging broadcast contents, the method including: (a) extracting a copy control bit which indicates whether broadcast contents will be stored and if stored, whether the broadcast contents will be stored after being encrypted from each broadcast content sequentially input; (b) detecting whether characteristics of the extracted copy control bit are changed; (c) creating first usage rule information which comprises an encryption method of corresponding broadcast contents if the copy control bit indicates that the broadcast contents will be stored after being encrypted, creating second usage rule information indicating the absence of the encryption method if the copy control bit indicates that the broadcast contents will be stored without being encrypted, and eliminating the broadcast contents if the copy control bit indicates that the broadcast contents will not be stored; and (d) performing operations (a) through (c) on a predetermined number of broadcast contents, and packaging and storing usage rule information that comprises the first and second usage rule information created as a result of performing operations (a) through (c), broadcast contents encrypted using the encryption method included in the first usage rule information generated by the broadcast contents, and broadcast contents that generate the second usage rule information.

According to another aspect of the present invention, there is provided a computer-readable recording medium on which programs for executing the methods is recorded.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth therein. Rather, these exemplary embodiments are provided so that this disclosure will be thorough and complete, and will fully convey the concept of the invention to those skilled in the art.

In the present invention, two models are used according to a source of contents. A first source of contents is local channels. Contents broadcast on local channels accompany a broadcast flag (BF) as a copy control bit, and the BF is either on or off.

As described above, the U.S. FCC is considering adding a one-bit BF to high definition (HD)-grade contents digitally broadcast within the U.S. To protect digital broadcast contents, the FCC also endeavors to develop a digital broadcasting implementation technology standard, which prevents unauthorized users from using digital broadcast contents when the BF included in the digital broadcast contents is on.

A second source of contents is cable channels. Copy control information (CCI) accompanies contents broadcast on cable channels. CCI includes "copy free," "copy once," "copy no more," and "copy never."

The BF or CCI embedded in broadcast contents and thus detected is recreated in the form of usage rule information. In other words, usage rule information is created based on a BF or CCI included in broadcast contents and detected. Since a method of detecting a BF or CCI falls outside the scope of the present invention, its description will be omitted.

Figure 3:
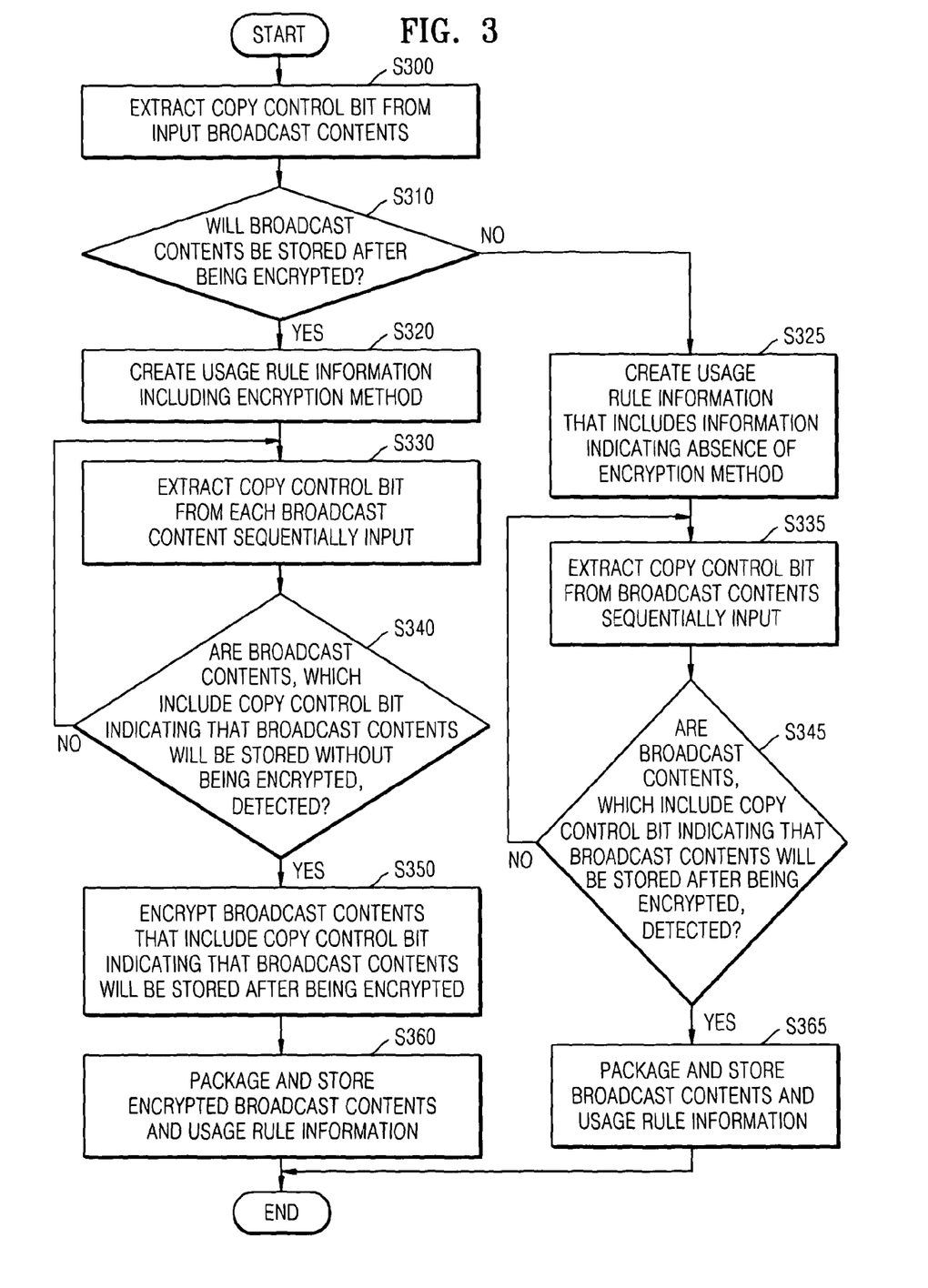
FIG. 3 is a flowchart illustrating a method of packaging broadcast contents according to an exemplary embodiment of the present invention.

FIG. 3 is a flowchart illustrating a method of packaging broadcast contents according to an exemplary embodiment of the present invention. The method is applied to a case where a copy control bit included in contents that are broadcast on a channel is a BF. Based on the copy control bit, it can be determined whether broadcast contents will be stored after being encrypted or without being encrypted.

First, a copy control bit is extracted from input broadcast contents (S300). Based on the copy control bit extracted in operation S300, it is determined whether the broadcast contents will be stored after being encrypted (S310). If it is determined that the broadcast contents will be stored after being encrypted in operation S310, usage rule information that includes an encryption method of the broadcast contents is created (S320). The usage rule information further includes content identification information which will be used as license information when the broadcast contents are decrypted. The usage rule information will be described in more detail later with reference to FIG. 7.

Next, a copy control bit is extracted from each new broadcast content sequentially input (S330). Then, it is determined whether broadcast contents including copy control bits indicating that the broadcast contents will be stored without being encrypted are detected (S340). If it is determined that the broadcast contents including copy control bits indicating that the broadcast contents will be stored without being encrypted are not detected, operation S330 is re-performed.

If it is determined that the broadcast contents including copy control bits indicating that the broadcast contents will be stored without being encrypted are detected in operation S340, the broadcast contents including the copy control bits which indicate that the broadcast contents will be stored after being encrypted are encrypted using the encryption method included in the usage rule information created in operation S320 (S350).

The broadcast contents encrypted in operation S350 and the usage rule information are packaged and stored (S360). Here, the usage rule information created in S320 may be packaged and stored in a file and placed before the broadcast contents input in operation S300.

If it is determined that the broadcast contents will be stored without being encrypted in operation S310, usage rule information that includes information indicating the absence of the encryption method is created (S325). Next, a copy control bit is extracted from each new broadcast content sequentially input after operation S300 (S335).

It is determined whether broadcast contents including copy control bits which indicate that the broadcast contents will be stored after being encrypted are detected (S345). If it is determined that the broadcast contents including copy control bits which indicate that the broadcast contents will be stored after being encrypted are not detected, operation S335 is re-performed.

If it is determined that the broadcast contents including copy control bits which indicate that the broadcast contents will be stored after being encrypted are detected in operation S345, the broadcast contents including the copy control bits which indicate that the broadcast contents will be stored without being encrypted and the usage rule information are packaged and stored (S365). Here, the usage rule information created in S325 may be packaged and stored in a file and placed before the broadcast contents input in operation S300.

Figure 4:
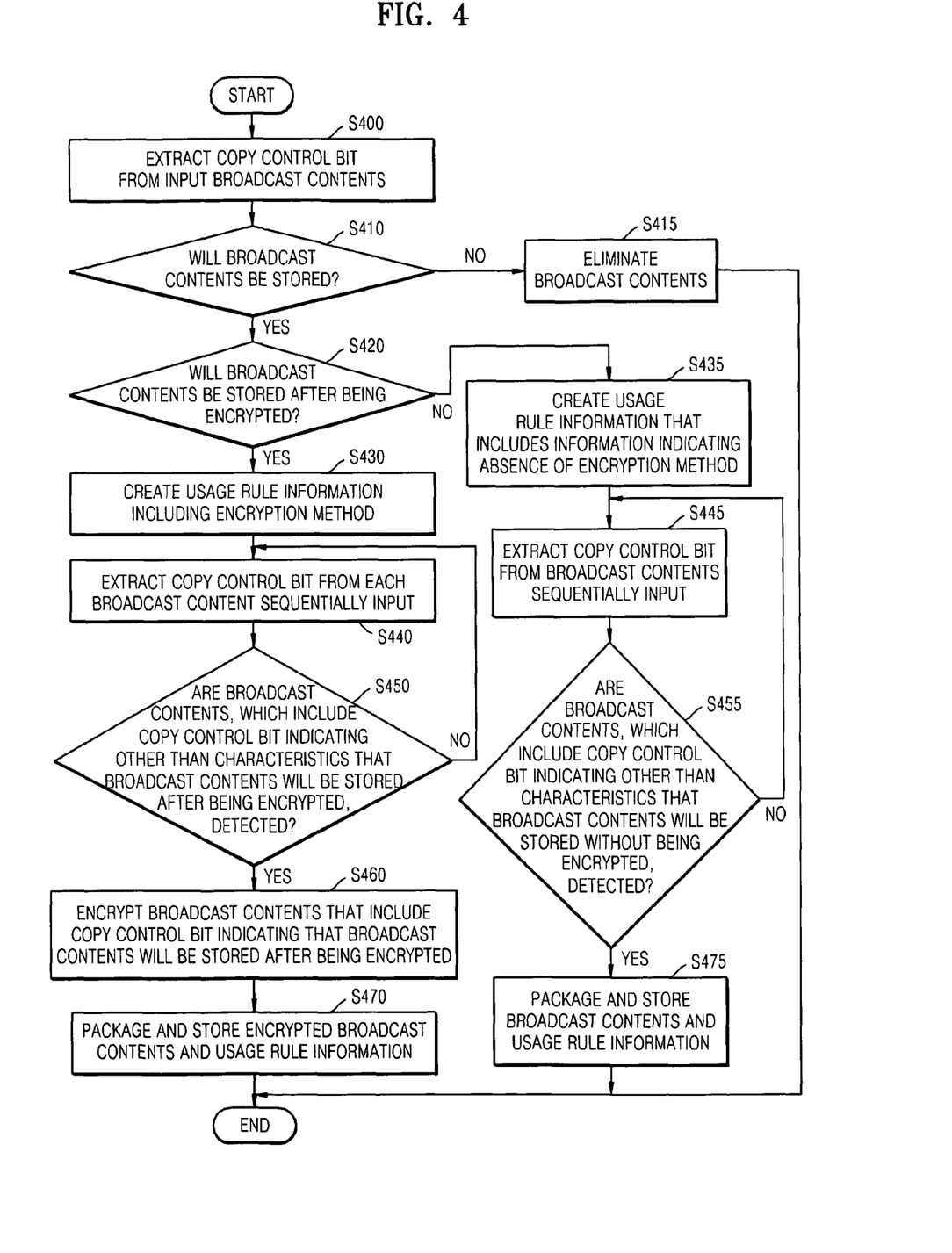
FIG. 4 is a flowchart illustrating a method of packaging broadcast contents according to another exemplary embodiment of the present invention.

FIG. 4 is a flowchart illustrating a method of packaging broadcast contents according to another exemplary embodiment of the present invention. The method is applied to a case where a copy control bit included in contents that are broadcast on a channel is CCI. Based on a copy control bit, it can be determined whether broadcast contents will be stored and, if stored, whether the broadcast contents will be stored after being encrypted or without being encrypted.

First, a copy control bit is extracted from input broadcast contents (S400). Based on the copy control bit extracted in operation S400, it is determined whether the broadcast contents will be stored (S410). If it is determined that the broadcast contents will not be stored, the broadcast contents input in operation S400 are eliminated (S415).

If it is determined that the broadcast contents will be stored in operation S410, it is determined whether the broadcast contents will be stored after being encrypted, based on the copy control bit extracted in operation S400 (S420). If it is determined that the broadcast contents will be stored after being encrypted, usage rule information that includes an encryption method of the broadcast contents is created (S430). The usage rule information further includes content identification information which will be used as license information when the broadcast contents are decrypted. The usage rule information will be described in more detail later with reference to FIG. 7.

Next, a copy control bit is extracted from each new broadcast content sequentially input after operation S400 (S440). Then, it is determined whether broadcast contents which include copy control bits indicating characteristics other than the broadcast contents will be stored without being encrypted are detected (S450). If it is determined that the broadcast contents which include copy control bits indicating characteristics other than the broadcast contents will be stored without being encrypted are not detected, operation S440 is re-performed.

If it is determined that the broadcast contents which include copy control bits indicating characteristics other than the broadcast contents will be stored without being encrypted in operation S450, the broadcast contents which include the copy control bits indicating other than the characteristics that the broadcast contents will be stored after being encrypted are encrypted using the encryption method which is included in the usage rule information created in operation S430 (S460).

The broadcast contents encrypted in operation S430 and the usage rule information are packaged and stored (S470). Here, the usage rule information created in S430 may be packaged and stored in a file and placed before the broadcast contents input in operation S400.

If it is determined that the broadcast contents will be stored without being encrypted in operation S420, usage rule information that includes information indicating the absence of the encryption method is created (S435). Next, a copy control bit is extracted from each new broadcast content sequentially input after operation S400 (S445).

It is determined whether broadcast contents which include copy control bits indicating characteristics other than the broadcast contents will be stored without being encrypted are detected (S455). If it is determined that the broadcast contents which include copy control bits indicating characteristics other than the broadcast contents will be stored without being encrypted are not detected, operation S445 is re-performed.

If it is determined that the broadcast contents which include copy control bits indicating characteristics other than the broadcast contents will be stored without being encrypted are detected in operation S455, the broadcast contents which include the copy control bits indicating that the broadcast contents will be stored without being encrypted and the usage rule information created in operation S435 are packaged and stored (S475). Here, the usage rule information created in S435 may be packaged and stored in a file and placed before the broadcast contents input in operation S400.

Figure 5:
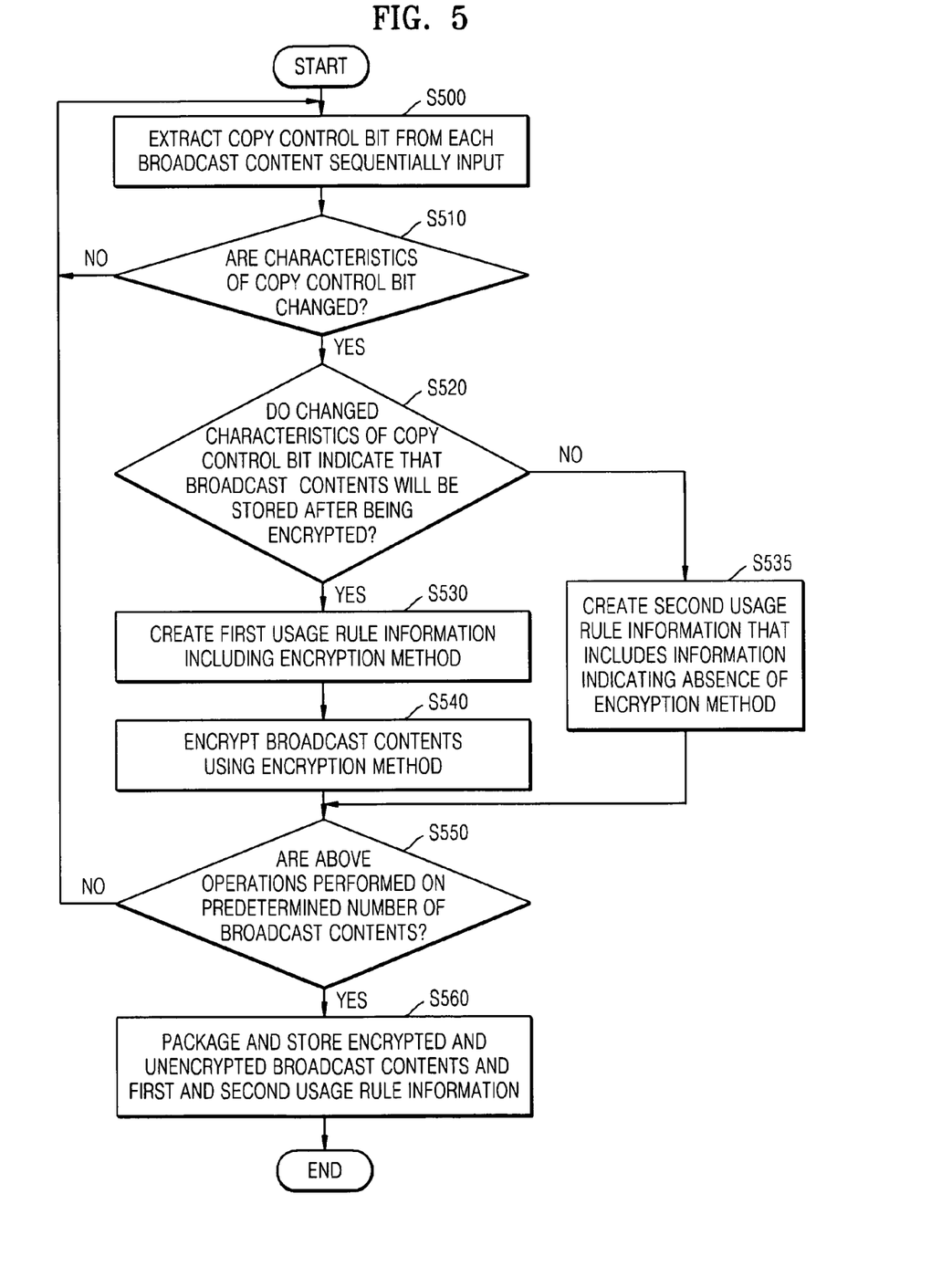
FIG. 5 is a flowchart illustrating a method of packaging broadcast contents according to another exemplary embodiment of the present invention.

FIG. 5 is a flowchart illustrating a method of packaging broadcast contents according to another exemplary embodiment of the present invention. The method is applied to a case where a copy control bit included in contents that are broadcast on a channel is a BF. Based on a copy control bit, it can be determined whether broadcast contents will be stored after being encrypted or without being encrypted.

First, a copy control bit is extracted from each broadcast content sequentially input (S500). It is determined whether characteristics of the copy control bit are changed in operation S500 (S510). If it is determined that the characteristics of the copy control bit remain unchanged, operation S500 is re-performed.

If it is determined that the characteristics of the copy control bit are changed in operation S510, it is determined whether the changed characteristics of the copy control bits indicate that the broadcast contents will be stored after being encrypted (S520). If it is determined that the broadcast contents will be stored after being encrypted in operation S520, first usage rule information including an encryption method of the broadcast contents is created. Here, the first usage rule information further includes content identification information which will be used as license information when the broadcast contents are decrypted. The first usage rule information will be described in more detail later with reference to FIG. 7.

Next, the broadcast contents are encrypted using the encryption method included in the first usage rule information created in operation S530 (S540). If it is determined that the broadcast contents will be stored without being encrypted in operation S520, second usage information that includes information indicating the absence of the encryption method is created (S535). The second usage rule information may further include content identification information. The second usage rule information will be described in more detail later with reference to FIG. 7.

It is determined whether operations S500 through S535 or S540 are performed on a predetermined number of broadcast contents (S550). If it is determined that operations S500 through S535 or S540 are not performed on the predetermined number of broadcast contents, operation S500 is re-performed.

If it is determined that operations S500 through S535 or S540 are performed on the predetermined number of broadcast contents in operation S550, at least one of the first and second usage rule information, and at least one of the broadcast contents that are encrypted in operation S530 and the broadcast contents that can be stored without being encrypted are packaged and stored (S560). Here, the first usage rule information and the second usage rule information may be packaged and stored in one file and placed before the encrypted and unencrypted broadcast contents.

Figure 6:
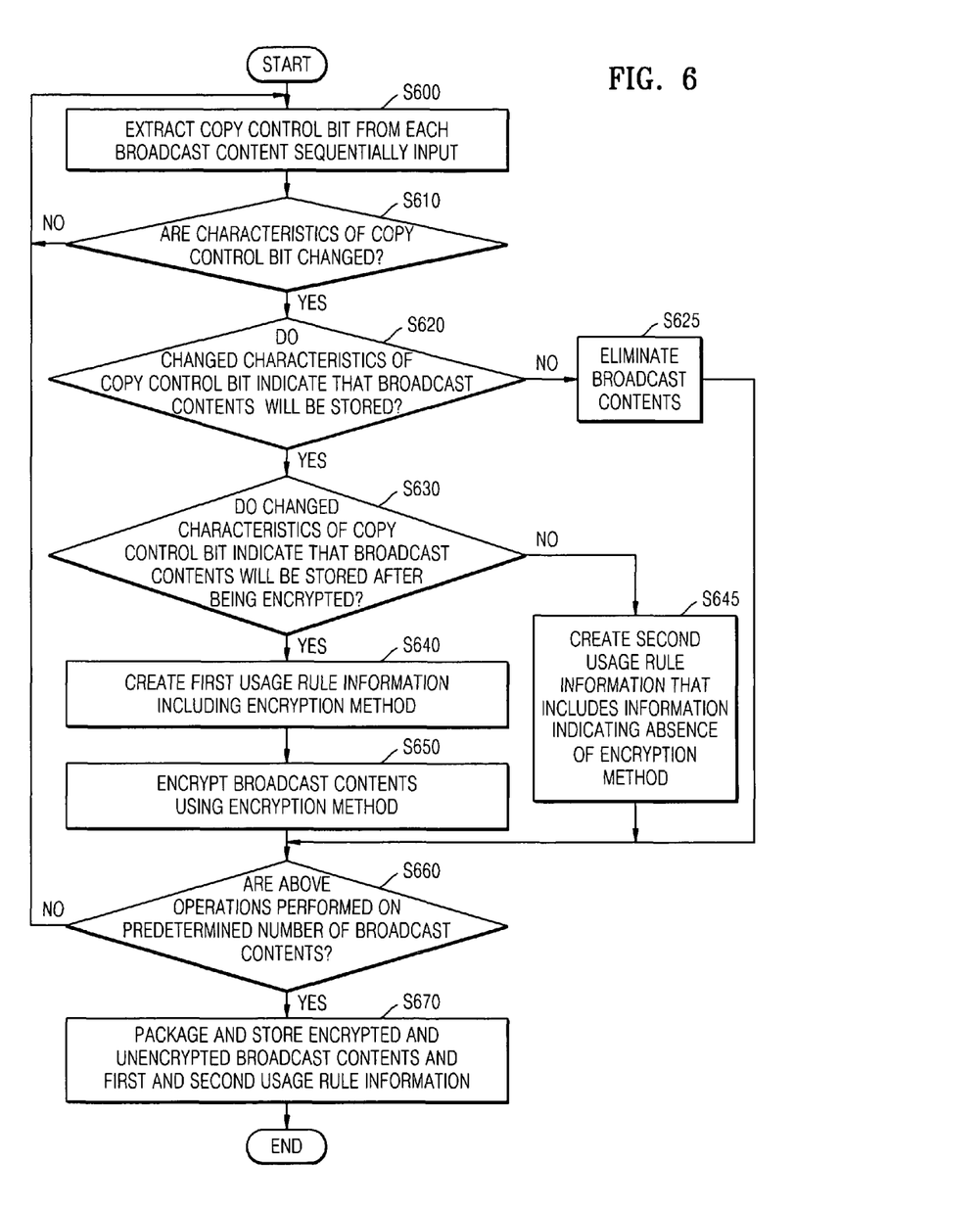
FIG. 6 is a flowchart illustrating a method of packaging broadcast contents according to another exemplary embodiment of the present invention.

FIG. 6 is a flowchart illustrating a method of packaging broadcast contents according to another exemplary embodiment of the present invention. First, a copy control bit indicating whether broadcast contents will be stored and whether the broadcast contents will be stored after being encrypted is extracted from each broadcast content sequentially input (S600).

It is determined whether characteristics of the copy control bit are changed in operation S600 (S610). If it is determined that the characteristics of the copy control bit remain unchanged, operation S600 is re-performed.

If it is determined that the characteristics of the copy control bit are changed in operation S610, it is determined whether the changed characteristics of the copy control bits indicate that the broadcast contents will be stored (S620). If it is determined that the broadcast contents will not be stored, the broadcast contents are eliminated (S625).

If it is determined that the broadcast contents will be stored in operation S620, it is determined whether the changed characteristics of the copy control bit indicate that the broadcast contents will be stored after being encrypted (S630). If it is determined that the broadcast contents will be stored after being encrypted in S630, first usage rule information including an encryption method of the broadcast contents is created (S640). Here, the first usage rule information further includes content identification information which will be used as license information when the broadcast contents are decrypted. The first usage rule information will be described in more detail later with reference to FIG. 7.

Next, the broadcast contents are encrypted using the encryption method included in the first usage rule information created in operation S640 (S650). If it is determined that the broadcast contents will be stored without being encrypted in operation S630, second usage information that includes information indicating the absence of the encryption method is created (S645). The second usage rule information may further include content identification information. The second usage rule information will be described in more detail later with reference to FIG. 7.

It is determined whether operations S600 through S645 or S650 are performed on a predetermined number of broadcast contents (S660). If it is determined that operations S600 through S645 or S650 are not performed on the predetermined number of broadcast contents in operation S660, operation S600 is re-performed.

If it is determined that operations S600 through S645 or S650 are performed on the predetermined number of broadcast contents in operation S660, at least one of the first and second usage rule information transmitted in operation S660, and at least one of the broadcast contents encrypted in operation S650 and the broadcast contents that can be stored without being encrypted are packaged and stored (S670). Here, the first usage rule information and the second usage rule information may be packaged and stored in one file and placed before the encrypted and unencrypted broadcast contents.

Figure 7:
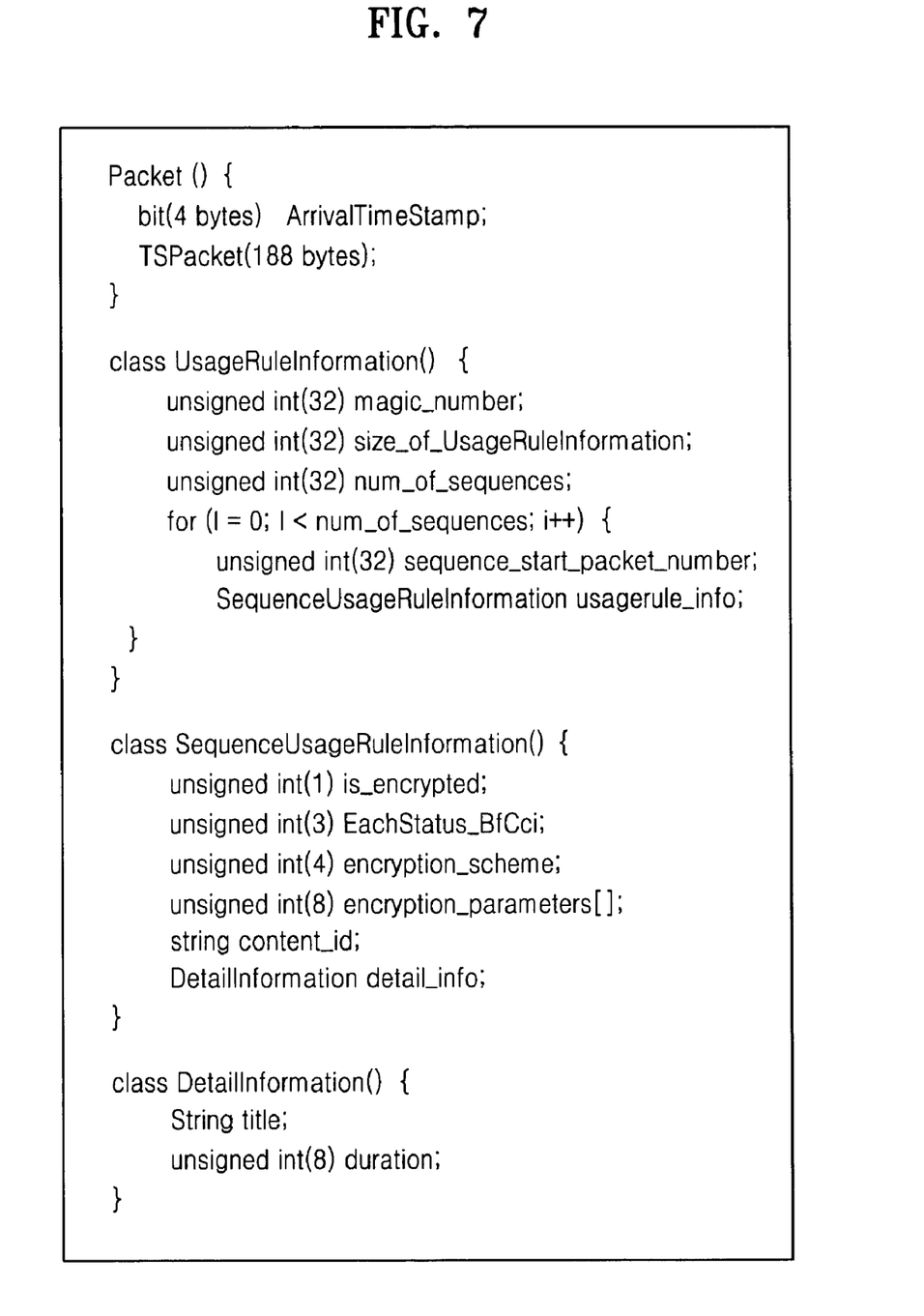
FIG. 7 illustrates an example of usage rule information according to an exemplary embodiment of the present invention.

FIG. 7 illustrates usage rule information created using the methods of packaging broadcast contents of FIGS. 3 through 6 according to an exemplary embodiment of the present invention. Referring to FIG. 7, a digital broadcasting receiver receives broadcast contents composed of 188-byte transport stream (TS) packets. The digital broadcasting receiver also receives a four-byte arrival time stamp, which is a counter value for arranging the TS packets received.

Usage rule information indicates whether a 188-byte TS packet will be stored and, if stored, whether the 188-byte TS packet will be stored after being encrypted. The usage rule information is placed before the 188-byte TS packet and includes a "magic_number," a "size_of_UsageRuleInformation," a "num_of_sequences," a "sequence_start_packet_number," and a "SequenceUsageRuleInformation."

The "magic_number" is a grammar indicating the start of a "UsageRuleInformation". The "size_of_UsageRuleInformation" indicates the entire size of the "UsageRuleInformation" including the "magic_number".

The "num_of_sequences" is a flag indicating how many packet sequences are included in broadcast contents. A packet sequence starts anew when a "usagerule_information" is changed. In other words, in the case of cable contents, when CCI changes, the "num_of_sequences" increases. In the case of BF contents, when a BF changes, the "num_of_sequences" increases.

The "sequence_start_packet_number" indicates a starting number of packet sequences.

A "SequenceUsageRuleInformation" includes an "is_encrypted," an "EachStatus_BfCci," an "encryption_scheme," an "encryption_parameters," a "content_id," and a "DetailedInformation."

The "is_encrypted" indicates whether a packet sequence is encrypted. For example, the "is_encrypted" may include 1 bit and may be set to 0x1 indicating "encryption" and 0x0 indicating "non-encryption."

The "EachStatus_BfCci" indicates a BF or CCI. For example, the "EachStatus_BfCci" may include 3 bits and may be set to 0x000 indicating "BF off," to 0x001 indicating "BF on," to 0x010 indicating "copy free," to 0x011 indicating "copy once," to 0x100 indicating "copy no more," and to 0x101 indicating "copy never." The "encryption_scheme"

indicates encryption schemes such as AES-128-CBC and AES-128-CTR. For example, the "encryption_scheme" may include 4 bits.

The "encryption_parameters" indicates parameter values used for decryption. For example, the "encryption_parameters" may include 8 bits. The "content_id" is a unique value assigned to each content and used when content identification for a corresponding content is required like a licence.

The "DetailInformation" may include title and duration. Title indicates the title of a packet sequence, and duration indicates the duration of the packet sequence.

FIG. 7 illustrates only an example of usage rule information according to an exemplary embodiment of the present invention. Thus, terms and their descriptions illustrated in FIG. 7 must not be limited thereto.

Figure 8:
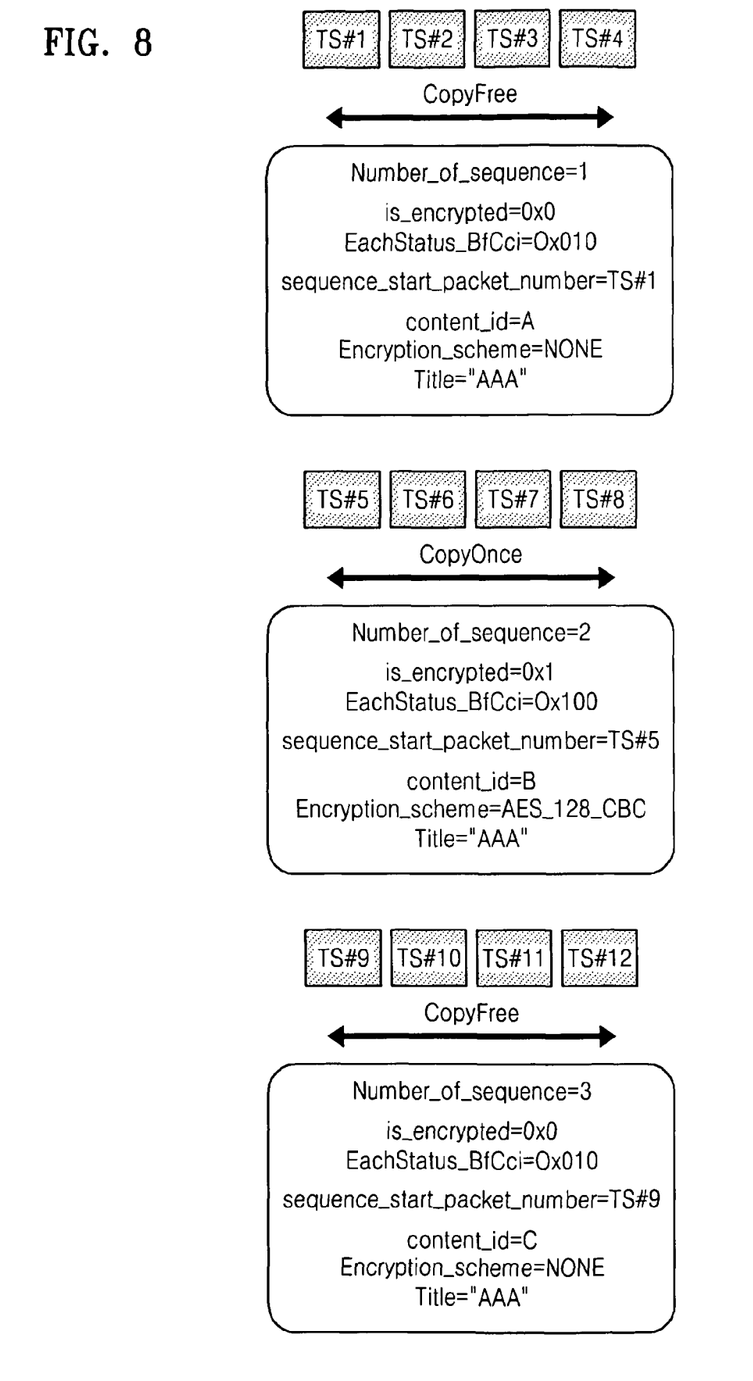
FIG. 8 illustrates an operation of packaging broadcast contents based on CCI of FIG. 7 according to an exemplary embodiment of the present invention.

FIG. 8 illustrates an operation of packaging broadcast contents based on the CCI of FIG. 7 according to an exemplary embodiment of the present invention. FIG. 8 illustrates a case where a digital broadcast receiver is currently receiving cable broadcast contents. Also, in FIG. 8, a program includes twelve 188-byte TS packets. The CCI of the first through fourth TS packets indicates "copy free," that of the fifth through eighth TS packets indicates "copy once," and that of the ninth through twelfth TS packets indicates "copy free." FIG. 7 can be referred to for other details not described in FIG. 8.

(A) A 4-byte arrival time stamp is attached to the first 188-byte TS packet to form a 192-byte packet.

(B) Since the CCI of the first TS packet is "copy free," the "num_of_sequences" is set to 1. Furthermore, since no encryption is performed, the "is_encrypted" is set to 0x0.

(C) The "EachStatus_BfCci" is set to 0x010 indicating "copy free."

(D) The "encryption_scheme" is set to NONE since encryption is not performed.

(E) The "sequence_start_packet_number" is set to, for example, TS#1.

(F) The "content_id" is set to, for example, A.

(G) Title and duration are set.

(H) Operation (A) is repeated for the second through fourth TS packets. Since usage rule information is created in operations (B) through (G), no additional usage rule information is created for the second through fourth TS packets.

(I) A 4-byte arrival time stamp is attached to the fifth 188-byte TS packet to form a 192-byte packet.

(J) Since the CCI of the fifth TS packet is "copy once," the "num_of_sequences" is set to 2, the fifth TS packet is encrypted, and the "is_encrypted" is set to 0x1.

(K) The "EachStatus_BfCci" is set to 0x100 indicating "copy no more."

(L) The "encryption_scheme" is set to an encryption algorithm assigned to the digital broadcast receiver, for example, AES-128-CBC in the present exemplary embodiment. Then, the "encryption_parameters" is set.

(M) The "sequence_start_packet_number" is set to, for example, TS#5.

(N) The "content_id" is set to, for example, B.

(O) Title and duration are set.

(P) Operation (I) is repeated for the sixth through eighth TS packets. Since usage rule information is created in operations (J) through (O), no additional usage rule information is created for the sixth through eighth TS packets.

(Q) A 4-byte arrival time stamp is attached to the ninth 188-byte TS packet to form a 192-byte packet.

(R) Since the CCI of the ninth TS packet is "copy free," which is changed from "copy once," the "num_of_sequences" is set to 3 and the "is_encrypted" is set to 0x0.

(S) The "EachStatus_BfCci" is set to 0x010 indicating "copy free."

(T) The "encryption_scheme" is set to NONE since no encryption is performed. The "encryption_parameters" is not set since the "encryption_scheme" is absent.

(U) The "sequence_start_packet_number" is set to, for example, TS#9.

(V) The "content_id" is set to, for example, C.

(W) Title and duration are set.

(X) Operation (Q) is repeated for the tenth through twelfth TS packets. Since usage rule information is created in operations (R) through (W), no additional usage rule information is created for the tenth through twelfth TS packets.

(Y) The usage rule information created during operations (A) through (X) and the twelve TS packets are added, packaged, and then stored in a predetermined position of a recording medium of the digital broadcast receiver.

Figure 9:
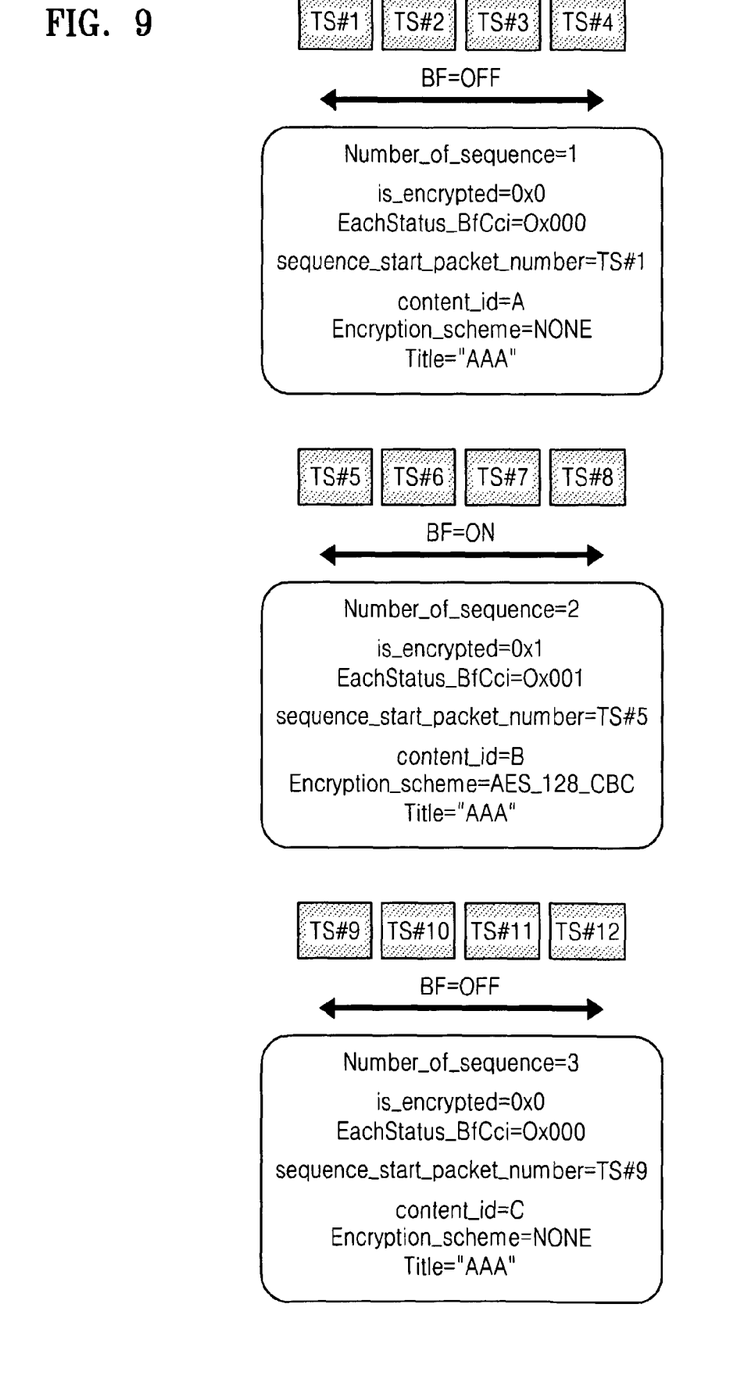
FIG. 9 illustrates an operation of packaging broadcast contents based on a broadcast flag according to an exemplary embodiment of the present invention.

The operation of packaging broadcast contents when a copy control bit is CCI has been described with reference to FIG. 8. However, the same may be applied to a case where the copy control bit is a BF, as shown in FIG. 9. In other words, a case where the BF is off is similar to the case where the CCI is "copy free" in FIG. 8, and a case where the BF is on is similar to the case where the CCI is "copy once" in FIG. 8.

In operations (C) and (S), when the BF is off, the "EachStatus_BfCci" is set to 0x000 indicating the BF being off. In operation (K), when the BF is on, the "EachStatus_BfCci" is set to 0x001 indicating the BF being on.

As describe above, according to the present invention, the unauthorized storing, copying, or redistribution of broadcast contents that are received through a digital broadcast receiver can be prevented using a BF or CCI included in the broadcast contents.

In addition, since broadcast contents are packaged using a content identification which will be used as license information when the broadcast contents are decrypted, even if the broadcast contents were copied without authorization, the broadcast contents cannot be played back. Thus, the broadcast contents can be protected more securely.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of packaging broadcast contents in a computer device comprising a processor having computer device-executable instructions, the method comprising:

(a) extracting, using the processor, a copy control bit from first broadcast contents which are input and determining whether the first broadcast contents are to be encrypted before being stored based on the extracted copy control bit;

(b) in response to determining in operation (a) that the first broadcast contents are to be encrypted before being stored, creating first usage rule information which comprises an encryption method, extracting the copy control bit from each of second broadcast contents which are sequentially input after the first broadcast contents, and determining whether each of the second broadcast contents is not to be encrypted before being stored based on the extracted copy control bit; and (c) in response to determining in operation (b) that one of the second broadcast contents is not to be encrypted before being stored, encrypting the first broadcast contents which are determined in operation (a) to be encrypted before being stored and the remaining second broadcast contents, excluding the one of the second broadcast contents that is not to be encrypted before being stored, which are determined in operation (b) to be encrypted before being stored, using the encryption method, and packaging and storing the encrypted first and second broadcast contents and the first usage rule information without generating other usage rule information for the encrypted second broadcast contents.

2. The method of claim 1, further comprising:

(b') if it is determined in operation (a) that the first broadcast contents are not to be encrypted before being stored, creating second usage rule information that comprises information indicating an absence of the encryption method, extracting the copy control bit from each of the second broadcast contents which are sequentially input after the first broadcast contents and determining whether each of the second broadcast contents is to be encrypted before being stored based on the extracted copy control bit; and (c') if it is determined that one of the second broadcast contents is to be encrypted before being stored, packaging and storing the first and second broadcast contents which include the copy control bit indicating that the first and second broadcast contents are not to be encrypted before being stored, and the second usage rule information.

3. The method of claim 2, wherein the first and second broadcast contents are digital terrestrial broadcast contents and the copy control bit is a broadcast flag.

4. The method of claim 2, wherein in operation (c) or (c'), the first or second usage rule information is packaged and stored in a file and placed before the first broadcast contents input in operation (a).

5. The method of claim 2, further comprising assigning a serial number to each of the first and second broadcast contents sequentially input, wherein each of the first and second usage rule information further comprises a serial number assigned to the first broadcast contents input in operation (a).

6. The method of claim 2, further comprising assigning an arrival time stamp to each of the first and second broadcast contents sequentially input, wherein each of the first and second usage rule information further comprises an arrival time stamp assigned to the first broadcast contents input in operation (a).

7. The method of claim 2, wherein each of the first and second usage rule information further comprises content identification information which will be used as license information when the first and second broadcast contents are decrypted.

8. A method of packaging broadcast contents in a computer device comprising a processor having computer device-executable instructions, the method comprising:

(a) extracting, using the processor, a copy control bit which indicates whether or not corresponding broadcast contents are to be encrypted before being stored from each broadcast content sequentially input;

(b) detecting whether characteristics of the extracted copy control bit are changed as compared to a directly previous extracted copy control bit if the directly previous extracted copy control bit exists;

(c) creating first usage rule information which comprises an encryption method of the corresponding broadcast contents if the copy control bit indicates that the corresponding broadcast contents are to be encrypted before being stored, and creating second usage rule information indicating an absence of the encryption method if the copy control bit indicates that the corresponding broadcast contents are not to be encrypted before being stored; and (d) performing operations (a) through (c) on a predetermined number of broadcast contents, and packaging and storing at least one of the first and second usage rule information, and at least one of broadcast contents encrypted using the encryption method and broadcast contents which include the copy control bit indicating that the corresponding broadcast contents are not to be encrypted before being stored, wherein only one usage rule information is created for plural broadcast contents of which the characteristics of the copy control bits thereof are unchanged according to the detecting.

9. The method of claim 8, wherein in operation (d), usage rule information that comprises at least one of the first usage rule information and the second usage rule information is packaged and stored in a file and placed before first broadcast contents of the broadcast contents sequentially input in operation (a).

10. The method of claim 8, wherein in operation (d), the predetermined number of broadcast contents are input within a range set by a user.

11. The method of claim 10, wherein at least one of the first and second usage rule information created is packaged and stored in a file and placed before first broadcast contents of the broadcast contents sequentially input in operation (a).

12. The method of claim 8, wherein the broadcast contents are digital terrestrial broadcast contents and the copy control bit is a broadcast flag.

13. The method of claim 8, further comprising assigning a serial number to each of the broadcast contents sequentially input, wherein each of the first and second usage rule information further comprises a serial number assigned to the broadcast contents.

14. The method of claim 8, further comprising assigning an arrival time stamp to each of the broadcast contents sequentially input, wherein each of the first and second usage rule information further comprises an arrival time stamp assigned to the broadcast contents comprising the detected copy control bit.

15. The method of claim 8, wherein each of the first and second usage rule information further comprises content identification information which will be used as license information when the broadcast contents are decrypted.

16. The method of claim 8, wherein the first usage rule information comprises different encryption methods.

17. A computer-readable recording medium on which a program is recorded for executing a method of packaging broadcast contents, the method comprising:

(a) extracting a copy control bit from first broadcast contents which are input and determining whether the first broadcast contents are to be encrypted before being stored based on the extracted copy control bit;

(b) in response to determining in operation (a) that the first broadcast contents are to be encrypted before being stored, creating first usage rule information which comprises an encryption method, extracting the copy control bit from each of second broadcast contents which are sequentially input after the first broadcast contents, and determining whether each of the second broadcast contents is not to be encrypted before being stored based on the corresponding extracted copy control bit; and (c) in response to determining in operation (b) that one of the second broadcast contents is not to be encrypted before being stored, encrypting the first broadcast contents which are determined in operation (a) to be encrypted before being stored and the remaining second broadcast contents, excluding the one of the second broadcast contents that is not to be encrypted before being stored, which are determined in operation (b) to be encrypted before being stored, using the encryption method, and packaging and storing the encrypted first and second broadcast contents and the first usage rule information without generating other usage rule information for the encrypted second broadcast contents.

18. A computer-readable recording medium on which a program is recorded for executing a method of packaging broadcast contents, the method comprising:

(a) extracting a copy control bit which indicates whether or not corresponding broadcast contents are to be encrypted before being stored from each broadcast content sequentially input;

(b) detecting whether characteristics of the extracted copy control bit are changed as compared to a directly previous extracted copy control bit if the directly previous extracted copy control bit exists;

(c) creating first usage rule information which comprises an encryption method of the corresponding broadcast contents if the copy control bit indicates that the corresponding broadcast contents are to be encrypted before being stored, and creating second usage rule information indicating an absence of the encryption method if the copy control bit indicates that the corresponding broadcast contents are not to be encrypted before being stored; and (d) performing operations (a) through (c) on a predetermined number of broadcast contents, and packaging and storing at least one of the first and second usage rule information, and at least one of broadcast contents encrypted using the encryption method and broadcast contents which include the copy control bit indicating that the corresponding broadcast contents are not to be encrypted before being stored, wherein only one usage rule information is created for plural broadcast contents of which the characteristics of the copy control bits thereof are unchanged according to the detecting.

* * * * *